United States Patent [19]
Whiting et al.

[11] Patent Number: 6,100,844
[45] Date of Patent: *Aug. 8, 2000

[54] RADAR APPARATUS WITH SIDELOBE BLANKING CIRCUIT

[75] Inventors: Ian Gerald Whiting, Ed Borne; John Arthur Scholz, Hengelo; Hugo Kleijer, Borne, all of Netherlands

[73] Assignee: Hollandse Signaalapparaten B.V., Hengelo, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/750,475

[22] PCT Filed: Jun. 6, 1995

[86] PCT No.: PCT/EP95/02200

§ 371 Date: Dec. 16, 1996

§ 102(e) Date: Dec. 16, 1996

[87] PCT Pub. No.: WO95/34828

PCT Pub. Date: Dec. 21, 1995

[30] Foreign Application Priority Data

Jun. 15, 1994 [NL] Netherlands ............ 9400973

[51] Int. Cl.[7] ................................... G01S 3/16
[52] U.S. Cl. ............................ 342/379; 342/380
[58] Field of Search .................. 342/381, 383, 342/380, 384, 90, 378, 379

[56] References Cited

U.S. PATENT DOCUMENTS

| | | | |
|---|---|---|---|
| 3,778,829 | 12/1973 | Longuemare, Jr. et al. | 342/92 |
| 3,875,569 | 4/1975 | Hill et al. | 342/90 |
| 3,900,874 | 8/1975 | Larkin et al. | 342/381 |
| 3,916,325 | 10/1975 | Lund | 342/379 |
| 3,916,408 | 10/1975 | Evans et al. | 342/379 |
| 3,943,511 | 3/1976 | Evans et al. | 342/94 |
| 4,021,805 | 5/1977 | Effinger et al. | 342/379 |
| 4,525,716 | 6/1985 | Carlin | 342/381 |
| 4,931,977 | 6/1990 | Klemes | 342/378 |
| 5,045,858 | 9/1991 | Eberhardt et al. | 342/379 |
| 5,302,961 | 4/1994 | Murrow et al. | 342/427 |
| 5,361,074 | 11/1994 | Hansen | 342/381 |
| 5,539,407 | 7/1996 | Scholz | 342/17 |

OTHER PUBLICATIONS

Skolnik, Merrill, "Introduction to Radar Systems", 2nd Edition, pp334–335, 1980.

Wardrop, Brian, "Digital Beamforming and Adaptive Techniques" IEEE Tutorial Meeting on Phased Array Radar, 1989.

Primary Examiner—Gregory C. Issing
Attorney, Agent, or Firm—Oblon, Spivak, McClelland, Maier & Neustadt, P. C.

[57] ABSTRACT

A radar apparatus provided with a sidelobe blanking circuit. The apparatus includes a directive antenna with a main receiver, and an auxiliary antenna with an auxiliary receiver. The apparatus also has a differential antenna with a differential receiver. Comparators compare the outputs of the auxiliary receiver and the differential receiver. Blanking does not occur when the output of the main receiver is larger than both other output signals.

4 Claims, 3 Drawing Sheets

RADAR APPARATUS WITH SIDELOBE BLANKING CIRCUIT

BACKGROUND OF THE INVENTION

Field of the Invention

The invention relates to a radar apparatus having a sidelobe blanking circuit, provided with a main channel comprising a directive antenna, having a main lobe and sidelobes, and a main receiver; an auxiliary channel comprising an auxiliary antenna, having a directivity substantially lower than the directivity of the directive antenna, and an auxiliary receiver; and comparison and switch means connected to the main receiver and the auxiliary receiver for passing signals for further processing when the signals appear stronger in the main channel than in the auxiliary channel.

A radar apparatus of this kind is known from the patent DE 30 28 225 C1. The known radar apparatus is based on the principle that the auxiliary antenna gain is greater than the directive antenna sidelobe gain. Sidelobe suppression is then obtained to a satisfactory extent, except for noise sources entering the directive antenna main lobe flanks. Particularly, if the radar apparatus is provided with a difference channel for determining the error angle between a direction of the main lobe and a direction of a target, a noise source entering this way constitutes a considerable drawback.

SUMMARY OF THE INVENTION

The present invention largely obviates this problem by actively involving the difference channel in the sidelobe blanking (SLB) process. It is thereto characterised in that the radar apparatus is provided with a difference channel comprising a difference antenna, for determining an error angle between a direction of the main lobe and a direction of a target, and a difference receiver; and in that the comparison and switch means are designed for passing signals for further processing when the signals appear stronger in the main channel than in the auxiliary channel and the difference channel in combination.

From U.S. Pat. No. 3,916,408 a radar apparatus provided with a coherent sidelobe canceller is known having an auxiliary antenna with a null in the direction of the main lobe of the directive antenna. This nul prevents clutter returns from entering the auxiliary channel, which clutter returns tend to degrade the coherent sidelobe cancelling.

A favourable embodiment of the invention is characterised in that the comparison and switch means are designed for passing signals for further processing when the signals appear stronger in the main channel than in the auxiliary channel and in the difference channel.

A further favourable embodiment of the invention is characterised in that a combined channel is provided, comprising a summation network for summing output signals of the auxiliary antenna and of the difference antenna, a combined receiver, connected to the output of the summation network; and in that the comparison and switch means are designed for passing signals for further processing when the signals appear stronger in the main channel than in the combined channel.

In this embodiment, the combined channel incorporates, practically unchanged, all characteristics of the difference channel. Thus, the combined channel may be used for the determination of error angles; the only difference being that the sidelobes are raised as it were by combining them with the output signals of the auxiliary antenna. The aim is then to allow the antenna gain of the combined antenna to be greater than that of the directive antenna, except in the central part of the main lobe.

A still further favourable embodiment of the invention is obtained for a radar apparatus equipped with an array of antenna elements from which the directive antenna is derived for the main channel by means of a main summation network. This embodiment is characterised in that for a combined channel, a combined auxiliary antenna and difference antenna is derived from the array by means of a collective summation network, that a combined receiver is provided, connected to the collective summation network, and that the comparison and switch means are designed for passing signals for further processing when the signals appear stronger in the main channel than in the combined channel.

BRIEF DESCRIPTION OF THE DRAWINGS

The invention will now be further explained with reference to the following figures of which.

DESCRIPTION OF THE PREFERRED EMBODIMENTS

Figure 1:
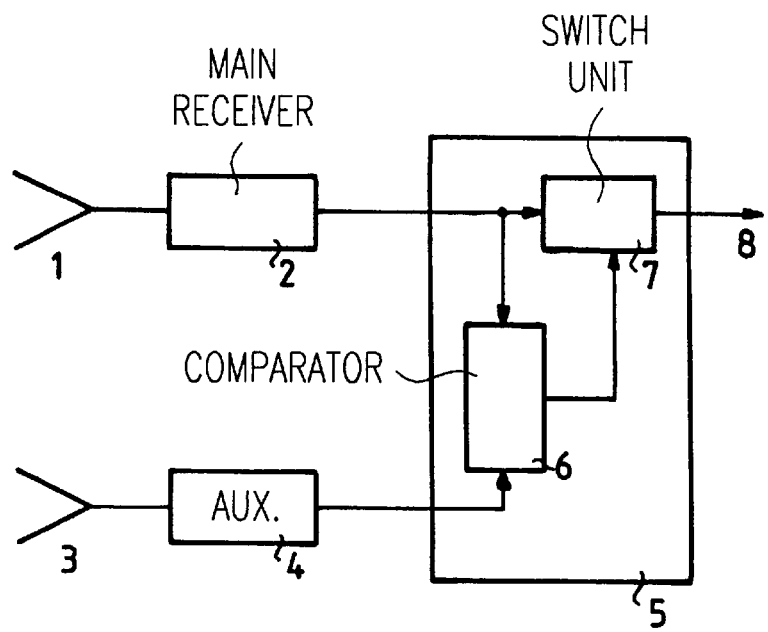
FIG. 1 schematically represents a SLB according to the state of the art.

FIG. 1 is a schematical representation of a radar apparatus provided with SLB according to the state of the art in which output signals of a main channel, comprising a directive antenna 1 and a main receiver 2, and output signals of an auxiliary channel, comprising an auxiliary antenna 3 having low directivity and an auxiliary receiver 4, are compared in a SLB-circuit 5 using a comparator 6 that commands a switch unit 7, such that only output signals of the main channel are passed that are stronger than output signals of the auxiliary channel and that appear at the output 8 for further processing. The operating principle is such that a jammer penetrating main receiver 2 via a sidelobe of the directive antenna 1 will gain strength and penetrate auxiliary receiver 4 via auxiliary antenna 3 after which switch unit 6 prevents the noise signal from emerging at the output 8. It will then be necessary, though, that at least in the direction of the jammer, the antenna gain of auxiliary antenna 3 is greater than the gain of antenna sidelobes of directive antenna 1.

Comparison is usually performed per radar range quantity per range-azimuth quantity or per range-azimuth-doppler quantity dependent on the system requirements.

Auxiliary antenna 3 is often referred to in the art as an omnidirectional antenna, which may be a correct term when a search radar apparatus is concerned.

Figure 2:
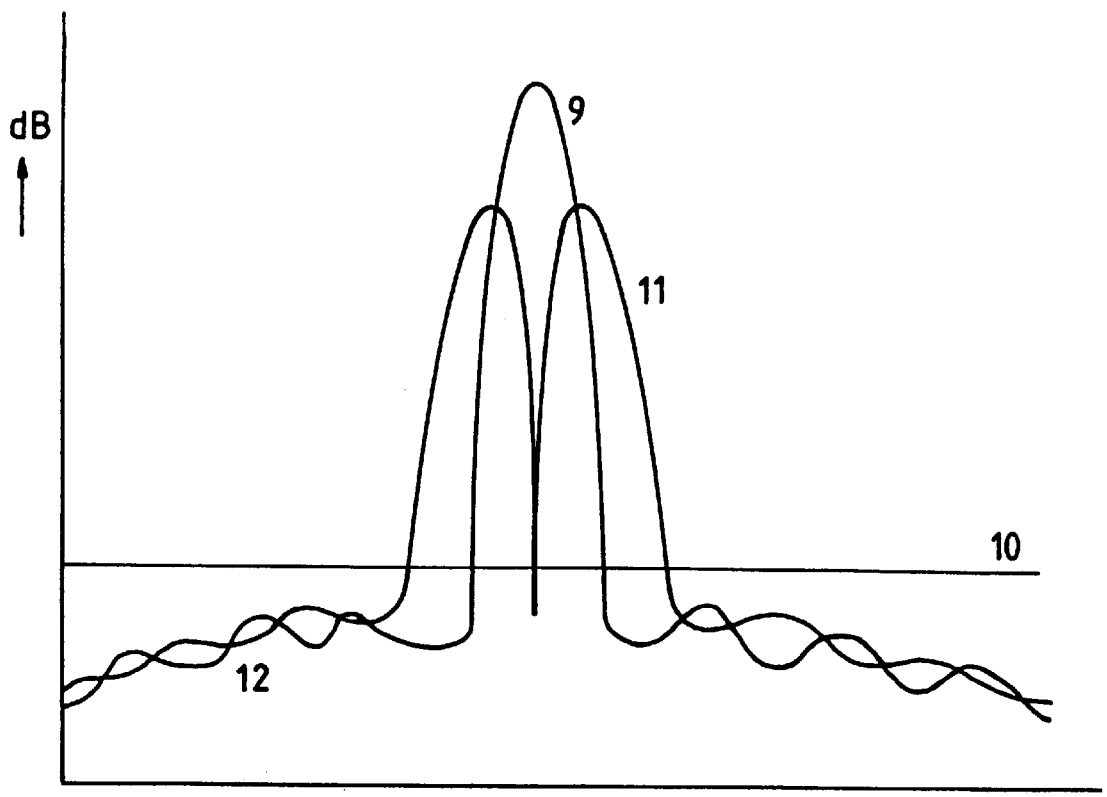
FIG. 2 represents antenne diagrams of a directive antenna, an auxiliary antenna and a difference antenna.

For a radar apparatus according to the invention, FIG. 2 represents a possible antenna diagram 9 of a directive antenna 1, antenna diagram 10 of an auxiliary antenna 3 and antenna diagram 11 of a difference antenna, the antenna gain being plotted as a function of an angle φ. The antenna gain of auxiliary antenna 3 shall in all directions be preferably greater than the gain of the sidelobes 12 of directive antenna 1.

FIG. 2 shows that noise sources entering a main lobe flank in the antenna diagram 9 are stronger in the main channel than in the auxiliary channel and will consequently also appear at output 8 of the SLB-circuit 5. This phenomenon may be used to advantage by sources of deliberate interference, hammers, for degrading the usefulness of a radar tracker directed at the target. Radar antennas in general and tracker antennas in particular are often provided with a difference antenna. According to the invention this difference antenna can be used to prevent jamming signals from entering via the flanks. In this respect it should be noted that in FIG. 2 the top of the main lobe in antenna diagram 9 projects above the antenna diagram 11, as opposed to its flanks. By making the stipulation that the signal strength is greater in the main channel than in the difference channel, jamming signals will be prevented from entering via a main lobe flank.

The directive antenna and the difference antenna can be realised in an embodiment well-known in the art by positioning two feedhorns side by side. Addition of the output signals of the gain/feedhorns yields a directive antenna, subtraction yields a difference antenna.

Figure 3:
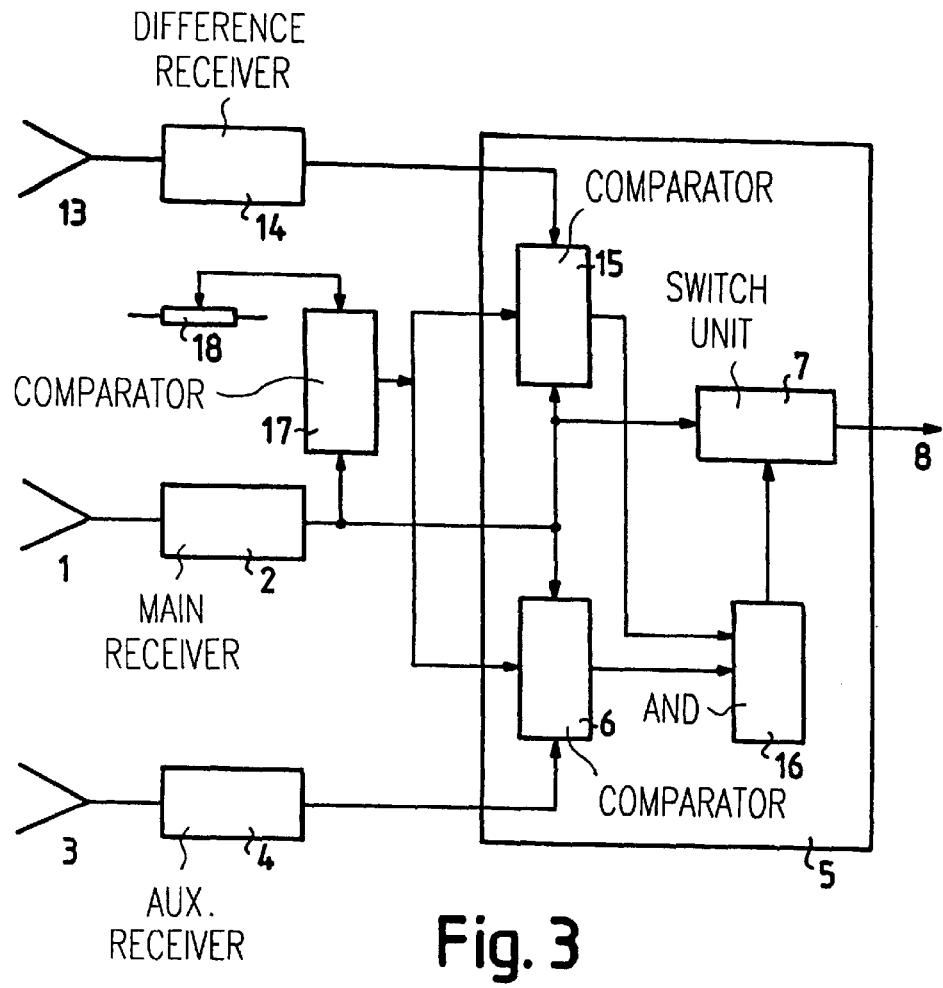
FIG. 3 schematically represents an embodiment of a SLB according to the invention.

A possible embodiment of a radar apparatus incorporating the invention is schematically represented in FIG. 3. In addition to the main channel comprising a directive antenna 1 and a main receiver 2, and the auxiliary channel comprising an auxiliary antenna 3 and an auxiliary receiver 4, this embodiment also incorporates a difference channel comprising a difference antenna 13 and a difference receiver 14. SLB-circuit 5 is equipped with a second comparator 15 that compares output signals of the main channel and the difference channel. Furthermore an AND circuit 16 is provided for combining the output signals of comparators 6 and 15, such that switch unit 7 passes only output signals of the main channel that are stronger than signals both in the auxiliary channel and in the difference channel. In situations in which the gain of auxiliary antenna 3 is in all directions smaller than the gain of the sidelobes of the directive antenna 1, it is possible, in order to prevent unnecessary changes in the position of switch means 7 caused by noise or extremely weak signals, to add a comparator 17 for comparing output signals of the main channel with a level previously selected by means of setting 18, the comparators 6 and 15 being enabled via the output of comparator 17 for output signals of a sufficient strength.

If the output signal of difference receiver 14 is used for determining an error angle, an additional switch unit may for this output signal be added to SLB-circuit 5 to operate simultaneously with switch unit 7.

Figure 4:
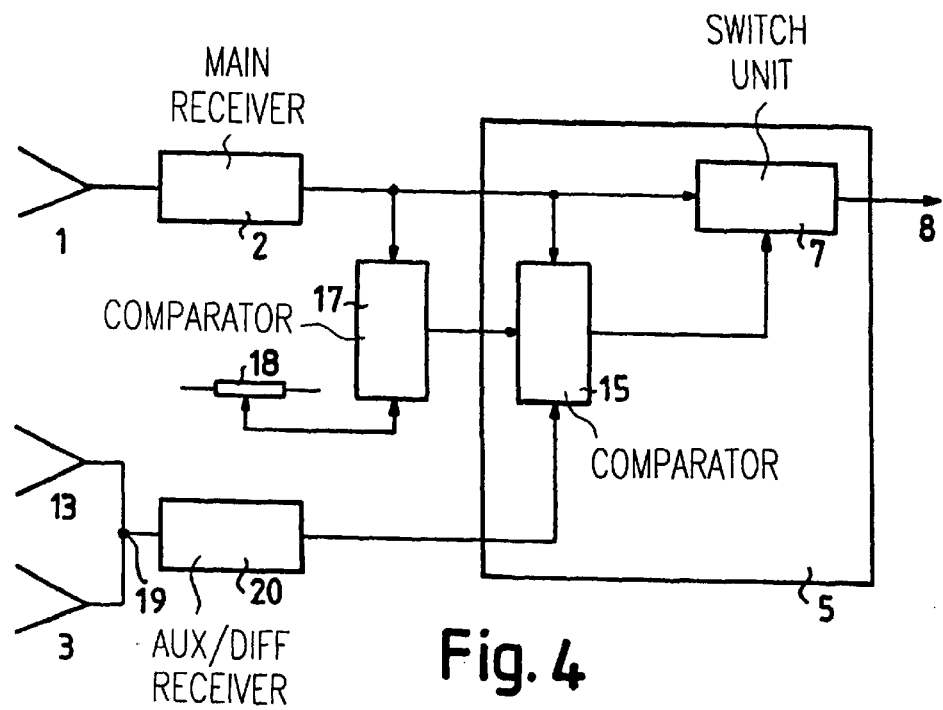
FIG. 4 schematically represents an embodiment of a SLB with a combined auxiliary channel/difference channel.

FIG. 4 schematically represents a favourable embodiment of a radar apparatus provided with a SLB-circuit according to the invention, in which the output signals of auxiliary antenna 3 and difference antenna 13 are summed in a conventional summation network 19. The combined output signal is subsequently applied to a combined auxiliary receiver/difference receiver 20 whose output signal is then compared with the output signal of main receiver 2 using comparator 15. The output signal of comparator 15 is subsequently used for changing the position of switch unit 7, such that only output signals of the main channel are passed that are stronger than output signals of the combined channel. Comparator 17 may again be added to prevent switching on noise. A switch unit may also be added to SLB-circuit 5 for passing the output signal of the combined auxiliary receiver/difference receiver to be used for determining an error angle. Apart from an enhanced SLB performance, a further considerable advantage of said embodiment is the omission of a receiver.

Figure 5:
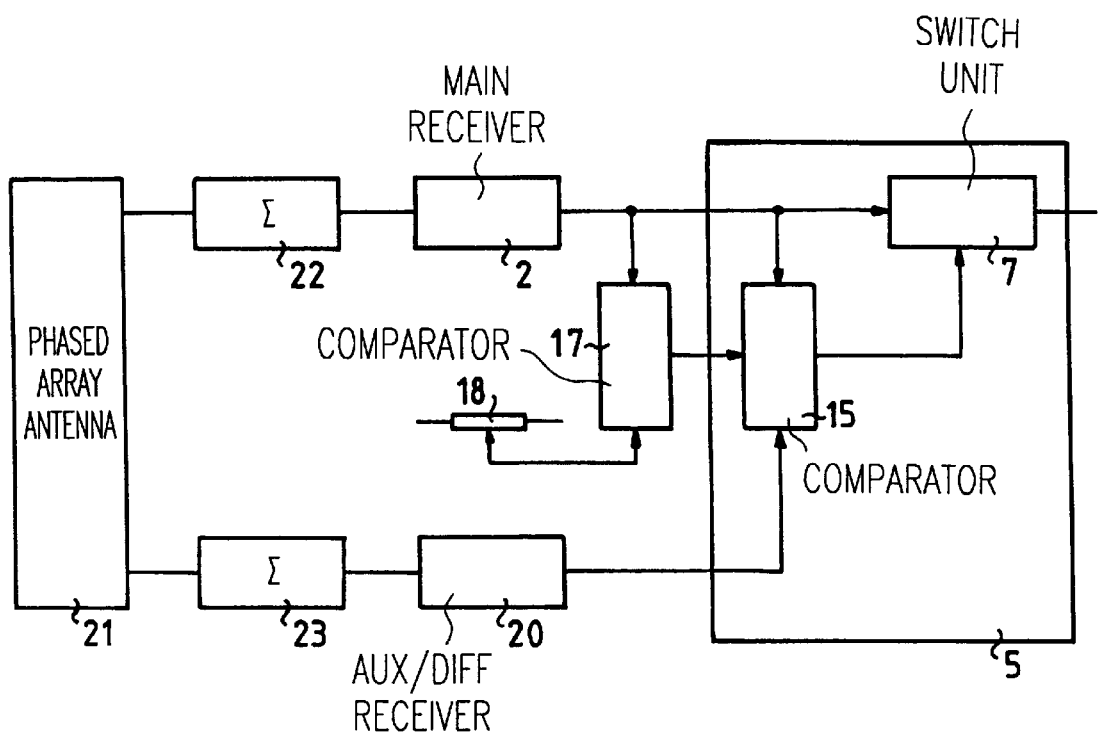
FIG. 5 schematically represents a phased array antenna provided with a SLB according to the invention.

FIG. 5 schematically represents an embodiment of the invention to be used in a phased array antenna 21 in which a directive antenna is realised by a main-summation network 22 through combination of output signals of antenna elements constituting phased array antenna 21 and a combined auxiliary antenna/difference antenna is realised by a collective summation network 23, again through combination of output signals of antenna elements constituting phased array antenna 21. The collective summation network 23 may for instance be implemented such to form a difference channel well-known in the art to which are furthermore added the outputs of a limited number of selected antenna elements which together constitute an auxiliary antenna. By means of comparator 15, output signals of main receiver 2 are again compared with output signals of combined auxiliary receiver/difference receiver 20, comparator 17 being again capable of preventing switching on noise, particularly if the auxiliary antenna gain tends to be locally substandard.

The antenna elements contained in a phased array antenna may be provided with two receiver outputs, for connection to the main-summation network 22 and to the collective summation network 23, each having its own phase and/or amplitude steering circuit for obtaining a directive antenna and a difference antenna. For obtaining a combined auxiliary antenna/difference antenna it will with respect to the phase and/or amplitude steering circuit suffice to introduce small, for instance random deviations to obtain a sidelobe level that is at least substantially on all points higher than the sidelobe level of the directive antenna. Another possibility is to calculate a suitable phase and/or amplitude steering circuit from the desired antenna diagram by means of Fourier transforms. This may be of advantage when all noise sources are situated in a certain direction, which enables an optimization of the auxiliary antenna gain.

The embodiment described on the basis of FIG. 5 has the advantage that an improved SLB performance is obtained and furthermore allows the omission of a receiver and a summation network.

What is claimed is:

1. A radar apparatus having a sidelobe blanking circuit and an antenna equipped with an array of antenna elements, comprising:

a main summation network, connected to the array of antenna elements to realize a directive antenna with a mainlobe and sidelobes, each having an antenna gain;

a combined summation network, connected to the array of antenna elements to realize a combined difference antenna/auxiliary antenna with a difference pattern in an azimuthal direction substantially corresponding to the main lobe of the directive antenna and a low directivity auxiliary lobe having an antenna gain that is substantially higher than the antenna gain of the sidelobes a direction of which substantially corresponds with a direction of the low directivity auxiliary antenna;

a main receiver connected to the main summation network;

a combined receiver connected to the combined summation network; and comparison and switch means connected to respective outputs of the main receiver and the combined receiver for passing main receiver output signals that are stronger than combined receiver output signals.

2. The radar apparatus of claim 1, wherein:

each element of said array of antenna elements having at least two receiver outputs, each of which having at least one of a respective phase steering circuit and an amplitude steering circuit, for connection to the main summation network and to the combined summation network; and the low directivity auxiliary lobe being realized by an introduction of deviations in control of the at least one of the phase steering circuit and amplitude steering circuit in receiver outputs connected to the combined summation network.

3. The radar apparatus of claim 1, wherein:

the main receiver being provided with a threshold circuit for comparing signals in the main channel with a previously determined threshold; and the comparison and switch means being activated only if a threshold crossing takes place.

4. The radar apparatus of claim 2, wherein:

the main receiver being provided with a threshold circuit for comparing signals in the main channel with a previously determined threshold; and the comparison and switch means being activated only if a threshold crossing takes place.

* * * * *